United States Patent [19]
Abbink et al.

[11] Patent Number: 5,253,524
[45] Date of Patent: Oct. 19, 1993

[54] INTEGRATED ACCELEROMETER WITH COIL INTERFACE SPACER

[75] Inventors: Henry C. Abbink, Westlake; Daryl K. Sakaida, Northridge; Stanley F. Wyse, Encino, all of Calif.

[73] Assignee: Litton Systems, Inc., Beverly Hills, Calif.

[21] Appl. No.: 951,799

[22] Filed: Sep. 28, 1992

Related U.S. Application Data

[62] Division of Ser. No. 633,260, Dec. 24, 1990, Pat. No. 5,191,794.

[51] Int. Cl.$^5$ .............................. G01P 15/13
[52] U.S. Cl. ........................ 73/497; 73/517 B
[58] Field of Search ................ 73/497, 517 B, 862.61

[56] References Cited
U.S. PATENT DOCUMENTS 4,697,455 10/1987 Norling .............................. 73/497
4,788,864 12/1988 Pier .................................. 73/517 B

*Primary Examiner*—John E. Chapman
*Attorney, Agent, or Firm*—Elliott N. Kramsky

[57] ABSTRACT

An integrated accelerometer includes features for minimizing the effects of foreseeable operational stresses. The accelerometer is of a type that includes a planar support base having an internal aperture for accommodating a hinged strut and limit stops for minimizing the travel of the shadow paddle portion of the strut. The limit stops are fabricated of material of suitable spring constant to provide an appropriate degree of "give" without degrading instrument performance or accuracy. Two-piece arrangements sandwich the hinges, thereby limiting flexure to an acceptable range. The predictable mechanical stresses resulting, for example, from thermal coefficient mismatches between the materials of the torquer coil and the strut are minimized by the use of a spacer intermediate the base and the coil. The spacer, fabricated of material whose thermal coefficient closely matches that of the pendulous mass is generally circular, and includes diametrically-opposed prongs on the upper and lower edges thereof, such arrangements of prongs being staggered by ninety degrees.

3 Claims, 4 Drawing Sheets

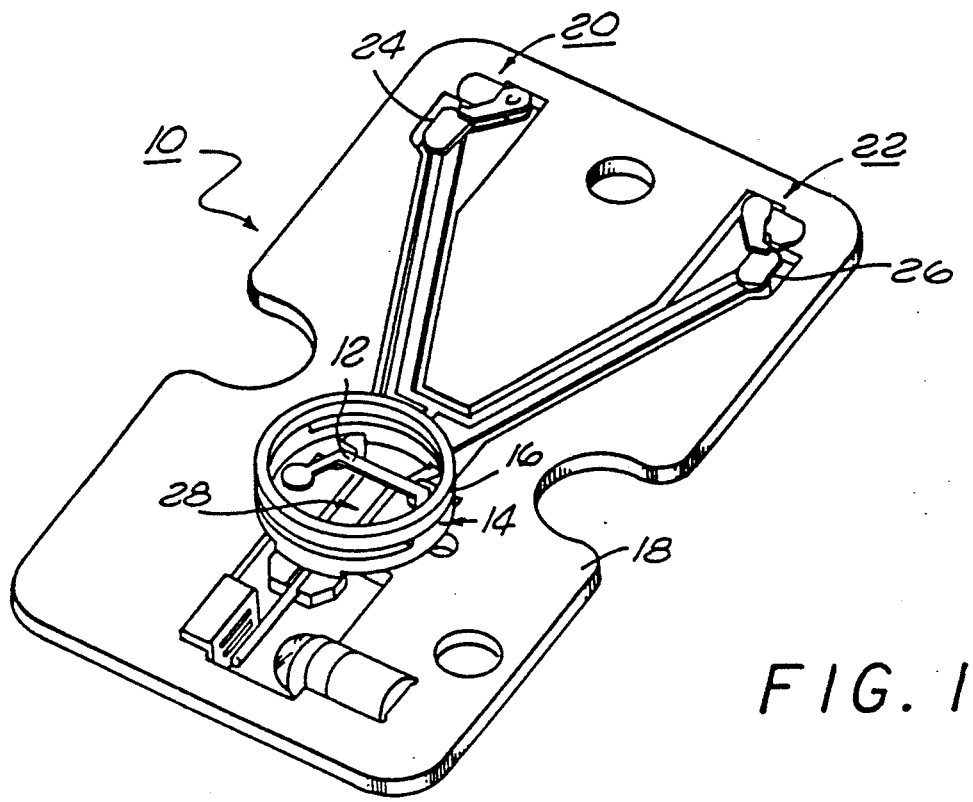
FIG. 1
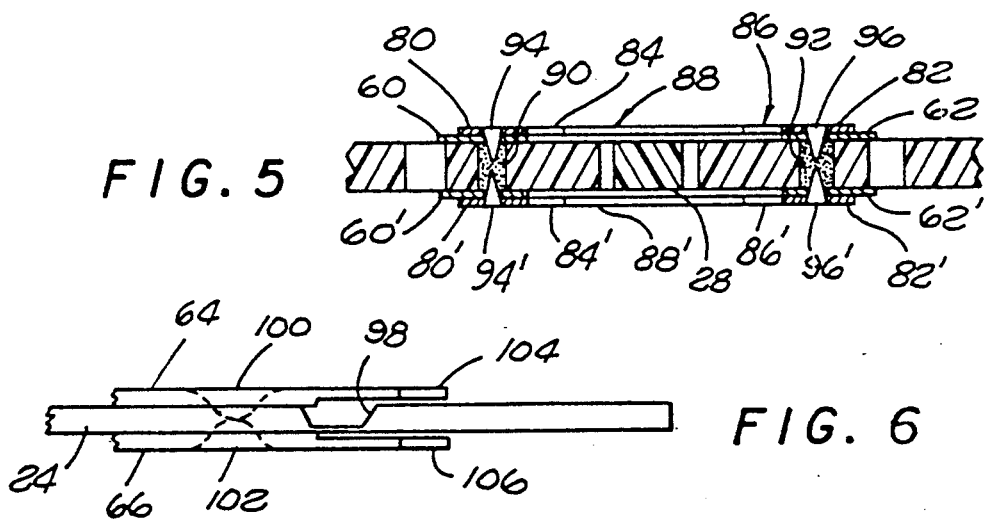
FIG. 5
FIG. 6
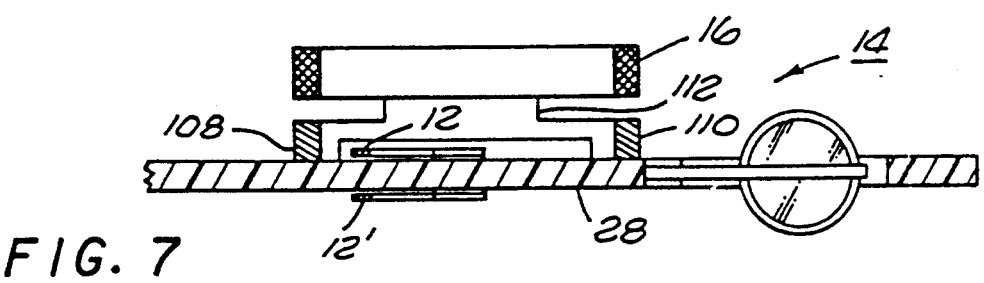
FIG. 7

INTEGRATED ACCELEROMETER WITH COIL INTERFACE SPACER

This application is a continuation of application Ser. No. 633,260, filed Dec. 24, 1990, now U.S. Pat. No. 5,191,794.

BACKGROUND

Related Application

The present invention is related to U.S. patent application Ser. No. 121,088 of Henry C. Abbink and Nicholas F. Pier entitled "Integrated Accelerometer Assembly" which was filed on Nov. 16, 1987, now U.S. Pat. No. 4,987,780.

Field of the Invention

The present invention relates to integrated accelerometers. More particularly, this invention pertains to an integrated accelerometer that includes a number of improved sub-assemblies for effecting enhanced accuracy and durability.

Description of the Prior Art

Accelerometers of the hinged, pendulous mass type have substantially replaced floated accelerometers in modern strapdown inertial navigation systems. Such hinged accelerometers offer smaller size, lighter weight and simplified construction. Functionally, a common type of single axis accelerometer comprises a pendulous mass that is suspended within a housing by flexure type hinges. When subjected to acceleration, the mass pivots or rotates about the hinge axis to thereby shutter the output of a light-emitting diode (LED) that is conventionally located adjacent to the mass' non-pivotal or "free" end. This is detected by a photodetector circuit. The circuit produces an output signal that is proportional to the sensed acceleration. Such signal is amplified and the resultant current is applied to a torquer coil that is mounted to the pendulous mass. The coil reacts with a permanent magnet that is affixed to the housing to return the mass to a substantially neutral (null) position. The torquing current provides a measure of the input acceleration.

While the foregoing arrangement may provide excellent performance in a relatively small package, its manufacture requires intensive manual assembly and adjustment resulting in substantial expense. Conventional designs include minute components that are attached by Epoxy or solder in processes that require highly dexterous and skilled personnel.

SUMMARY

The foregoing and additional shortcomings of the prior art are addressed by the present invention that provides an integrated accelerometer with durable sub-assemblies.

The accelerometer includes a planar support base having an internal aperture. A pendulous mass includes a pair of spaced flexible hinges for pivotally supporting the pendulous mass within the aperture. A torquer coil is substantially round. A substantially round interface spacer of material having a coefficient of thermal expansion that is less than that of the coil, is fixed to the pendulous mass and to the coil to limit the transmission of mechanical stresses between the coil and the pendulous mass substantially. The spacer includes a pair of upstanding prongs at its upper edge for contacting the torquer coil and a pair of downwardly-directed prongs at the lower edge for contacting the pendulous mass.

The preceding and additional aspects of the present invention shall become further apparent from the detailed description that follows. This detailed written description is accompanied by a set of drawing figures. Numerals of the drawing figures, corresponding to those of the written description, point to the various features of the invention. Like numerals refer to like features throughout both the drawing figures and the written description.

BRIEF DESCRIPTION OF THE DRAWINGS

FIG. 1 is a perspective view of an integrated accelerometer in accordance with the invention;

FIG. 5 is a cross-sectional view taken at line 5—5 of FIG. 3 for illustrating the arrangement of the invention for attaching compliant limit stops to the planar base of the integrated accelerometer of the invention;

FIG. 6 is a cross-sectional view taken at line 6—6 of FIG. 3 for illustrating the hard hinge stop of the integrated accelerometer of the invention; and FIG. 7 is a cross-sectional view taken at line 7—7 of FIG. 3 for illustrating the torquer coil arrangement of the ceramic accelerometer of the invention.

DETAILED DESCRIPTION

Figure 2:
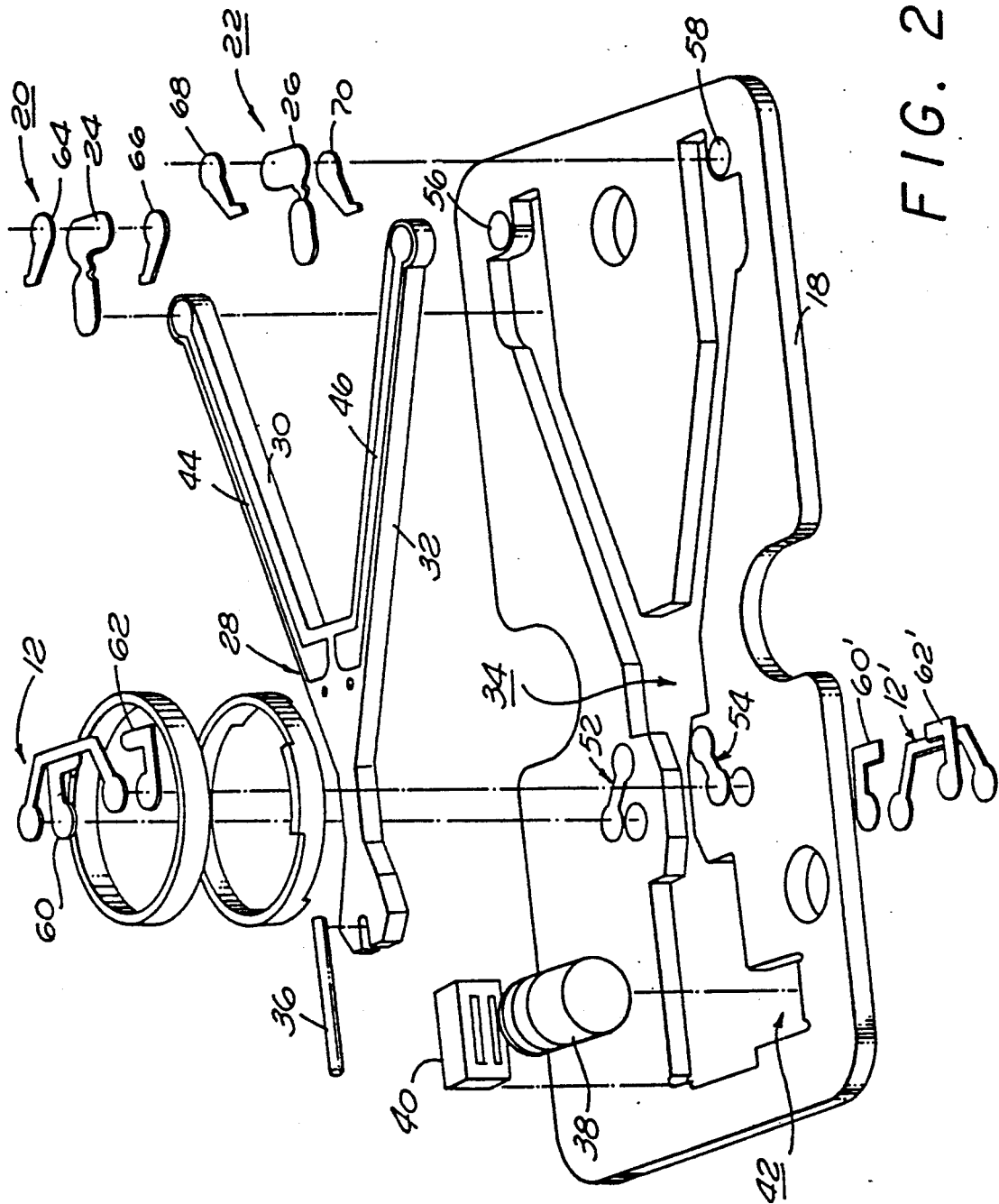
FIG. 2 is an exploded perspective view of the integrated accelerometer of the invention.

FIG. 1 is a perspective view of a ceramic accelerometer in accordance with the invention. The accelerometer 10 comprises a compact, simplified and relatively easy-to-manufacture device that is suitable for batch processing. This is to be contrasted with the complex and accordingly difficult-to-manufacture assemblages of the prior art that include block-like metallic support frames and require numerous discrete fasteners that demand hand-assembly. An improvement over this type of accelerometer is disclosed and taught in co-pending U.S. patent application Serial No. 121,088 of Abbink et al. entitled "Integrated Accelerometer Assembly". The device disclosed in that patent application represents an improvement over the bulky assemblages of the prior art and, due to its generally-planar structure and the types of materials and modes of fixation of sub-assemblies employed, is amenable to economical manufacture. (Note: Although the element 10 is termed an "accelerometer" throughout this application, it is understood by those in the art that the disclosed device does not constitute a complete accelerometer which would, of course, also include a magnet and a magnetic circuit in addition to the component elements enumerated herein.)

The present invention represents a further refinement in integrated accelerometer design by providing a planar integrated accelerometer 10 of increased durability, accuracy and useful life. More specifically, the present invention comprises an accelerometer 10 that includes a number of improved sub-assemblies that interact to enhance the basic planar integrated accelerometer concept. Such sub-assemblies include a limit stop 12, a spacer 14 for a mechanically isolating the accelerometer torquer coil 16 from the strut 28 to overcome the effects of unavoidable thermal-mechanical mismatches and hard hinge stop assemblies 20 and 22 that limit the flexure of hinges 24 and 26 within "safe" ranges.

FIG. 2 is an exploded perspective view of the accelerometer 10. The operation and general arrangement of such apparatus is well-known. A strut 28 that includes legs 30 and 32 is flexibly positioned within an internal aperture 34 of the accelerometer base 18 by means of hinges 24 and 26. The base 18 is generally planar. A shadow paddle 36 is fixed to the free end of the strut 28.

A light-emitting diode (LED) 38 is accommodated within a recess 42 in the internal aperture 34 and thereby fixed to the base 18. A photodetector 40 is similarly fixed to the base 18 in opposed relationship to the LED 38. When assembled, the shadow paddle 36 lies between the LED 38 and the photodetector 40 when the pendulous mass 28 is unstressed. That is, the hinges 24 and 26 maintain the attitude of the strut 28 relative to the base 18 absent any external acceleration force, so that the shadow paddle 36 interrupt the transmission of emitted light from the LED 38 to the photodetector 40. The imposition of an acceleration force normal to the plane of the base 18 (i.e. the sensitive axis of the device) deflects of the free end of the pendulous mass 28 relative to the base 18 and causes a corresponding displacement of the shadow paddle 36. Light, proportional in amount to the physical degree of displacement of the shadow paddle 36, will be detected at the photodetector 40 and a d.c. electrical signal of corresponding value thereby generated.

The d.c. signal is transmitted to a conventional feedback control system (not shown) wherein a corrective current is generated that is delivered to the torquer coil 16 to drive the accelerometer magnetically in a direction opposite to the displacement caused by the acceleration force. The amount of current required to return the shadow paddle 36 to "neutral" (as indicated by the photodetector 40) provides a measure of the acceleration force sensed.

Metal conductors 44 and 46 are formed upon the legs 32 and 30 respectively of the strut 28. Since the metallized conductors and the strut members are of different thermal expansion coefficients, undesirable bending that could produce inaccurate measurements is avoided by plating similar materials to both the top and bottom surfaces of the legs. As can be seen in FIG. 4, a top plan view of the accelerometer 10, metal conductors 46' and 44' of corresponding design are fixed to the opposed sides of the legs 30 and 32 respectively. The wire conductors 48 and 50 that provide electrical communication between the conductors 44' and 46' and the torquer coil 16 can be clearly seen in FIGS. 3 and 4, bottom and top plan views of the accelerometer respectively.

Returning to FIG. 2, the limit stops 12 and 12' are substantially mutually aligned. Pads 52, 54, 56 and 58 of residual metal cover laser weld "anchors" (discussed below) fabricated of layers of chrome, nickel and gold. Spacers 60, 62 are located between the ends of the limit stop 12 and the pads 52 and 54. Each of the spacers is preferably fabricated of 0.001 inch thick photoformed Elgiloy. Pairs of leaves 64, 66, and 68, 70 comprise hard hinge stop assemblies 20 and 22 respectively. The leaves 64 through 70 are preferably of 0.005 inch stainless steel. They may be alternatively formed of 0.003 inch thick photoformed Elgiloy. As will be discussed in greater detail below, the hinges 24 and 26 are attached to the base 18 by laser welds (alternatively, by Epoxy or like adhesive) while the leaf-like hard stops comprised of the leaves 64 through 70 are laser welded thereto.

Figure 3:
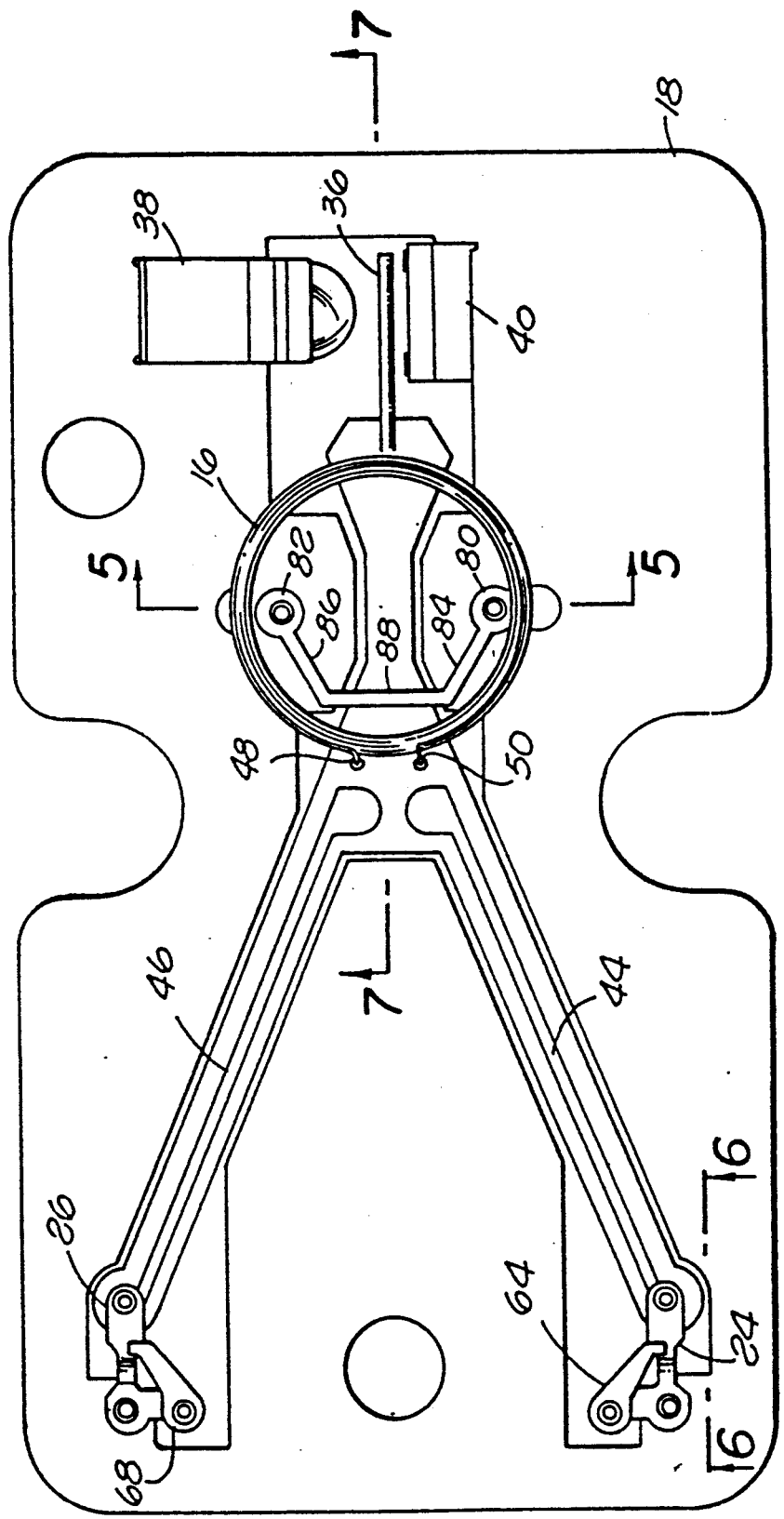
FIG. 3 is bottom plan view of the integrated accelerometer of the invention.
Figure 4:
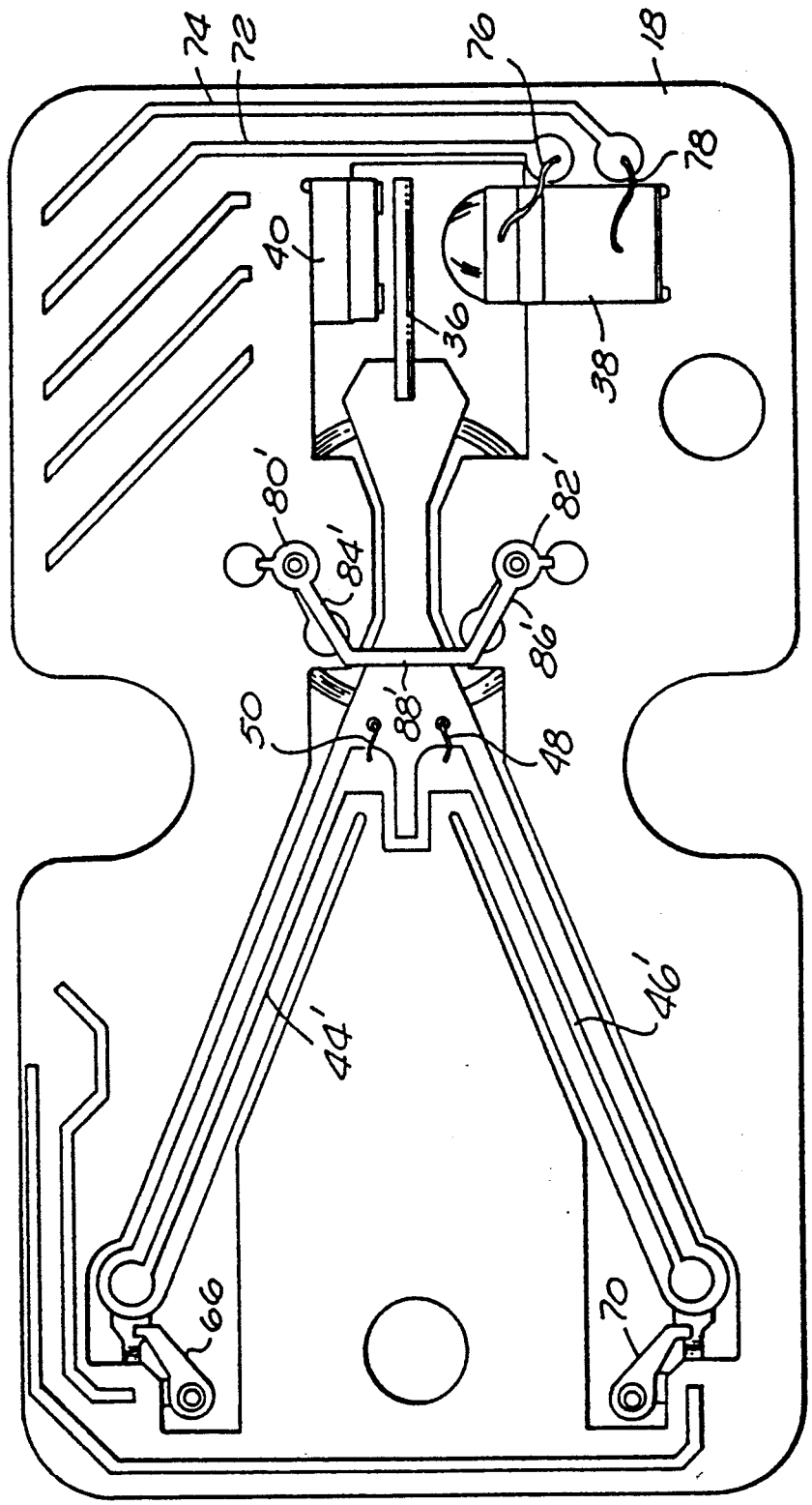
FIG. 4 is a top plan view of the integrated accelerometer of the invention.

FIGS. 3 and 4 are bottom and top plan views of the assembled accelerometer 10. Primed numerals indicate features fixed to the top of the accelerometer 10 that correspond in structure to like features identified previously with reference to the bottom of the accelerometer. In FIG. 4, it can be noted that metallizations 72 and 74, in electrical contact with wires 76 and 78, are provided for electrical communication between the LED 38 and the feedback control circuitry (not shown).

As can be seen in FIGS. 3 and 4, limit stops 12 and 12' are positioned at opposite sides of the accelerometer base 18 for limiting the deflection of the strut 28 in response to an input acceleration force along its sensitive axis. The limit stops 12 and 12' are of a compliant or "springy" design and fabrication. Unlike arrangements of the prior art which do not provide an appreciable amount of "give", the limit stops 12 and 12' act like shock absorbers, reducing hinge stress that can produce undesirable bias shifts when a hinge is bent (i.e. deformed due to shock). Due to the design and material compositions of the stops 12 and 12', they may be temporarily deformed within elastic limits and flexed to facilitate the removal of grit and the like. Furthermore, the stops 12 and 12' can be adjusted by placing a shim thereunder to force a wider gap if it is desired to permit increased deflection of the strut 28.

The limit stops 12 and 12' are laser welded at opposed ends 80 and 82 (80' and 82') to laser weld anchors in the accelerometer base 18. Each limit stop is of a roughly U-shaped design including inclined side arms 84 and 86 joined to a central arm 88 for contacting the mass 28. The limit stops 12 and 12' are proportioned so that the central arms 88 and 88' approximately overlie and are positioned to contact the pendulous mass 28 at its center of percussion. This prevents the imposition of translational stresses on the hinges 24 and 26 to enhance the durability and accuracy of the accelerometer 10.

FIG. 5 is an enlarged cross-sectional view of the accelerometer taken at line 5—5 of FIG. 3 that illustrates the means for anchoring the ends of the limit stops 12 and 12' to the base 18. As can be seen, the ends 80 and 82 (80' and 82') of the limit stops are laser welded to regions 90 and 92 that have been electroplated with copper. Laser welded nuggets 94 and 96 secure the 0.003 inch thick photoformed limit stops 12 and 12' and 0.001 inch thick spacers 60 and 62 of Elgiloy in sandwich-like arrangements as shown. The nuggets substantially comprise mixtures of Elgiloy and copper with traces of chromium, nickel and gold as a result of the laser welding process.

FIG. 6 is a cross-sectional view of the accelerometer taken at line 6—6 of FIG. 3 that illustrates the arrangement of a representative hard hinge stop 20 of the invention. The hinge stops act in cooperation with the compliant limit stops to protect the hinges from the potentially deleterious and deforming effects of both extreme acceleration forces and transients in the signals applied to the coil 16 that act upon the strut 28.

The hinge 24 is fixed to the base 18 by laser welding to copper anchors or by an appropriate adhesive such as Epoxy. A notch 98 in the hinge 24 defines the region of maximum flexure. Leaves 64 and 66 of the hard hinge stop 20 are arranged immediately above and below the hinge 24 and in contact therewith. The leaves 64 and 66 (of 0.003 inch thick photoformed Elgiloy) are individually fixed to the top and bottom of the hinge 24 by means of laser welds 100 and 102 respectively. Referring to both FIG. 6 and the prior figures, the leaves are seen to comprise matching shapes that extend beyond the notch 98 and thereby encompass the region of maximum hinge flexure. The substantially pear-shaped leaves terminate in transverse lips 104 and 106 that extend across the width of the hinge 24 beyond the flexure-defining notch 98 and provide a means for restraining hinge flexure in a direction of translation perpendicular to the accelerometer base 18. Due to the relative location of the lips 104, 106, the hard stops permit rotation of the strut 28 well beyond the limit established for translation of the hinges.

FIG. 7 is a cross-sectional view of the accelerometer 10 taken at line 7—7 of FIG. 3 that provides a detailed view of the arrangement and interaction that exists between the coil spacer 14 and the torquer coil 16. In the prior art, the coil 16, of conductive metallic composition such as copper, is fixed to the strut 28. Due to the existence of significant mismatches between the thermal coefficients of expansion of the material of the strut 28 and that of the torquer coil 16, harmful, perhaps delaminating, strains can occur at the coil-to-mass interface. This is avoided in the present invention by the use of a spacer 14 of unique design. The spacer 14 is formed of material of compatible thermal expansion coefficient to that of the strut 28. Thus, changes in temperature do not induce undesirable stresses at the interface between the spacer 14 and the strut 28. Furthermore, the spacer includes upper and lower pairs of diagonally-opposed prongs 108, 110, 112 and 114. The upper pair of prongs 112, 114 contacts the thermally-incompatible torquer coil 16. Thus, differential expansions and contractions between the coil 16 and the spacer 14 are limited in effect to the inward and outward deflections of the upper prongs 112 and 114 that are translated into corresponding bending of the torquer coil 16 to assume an elliptical shape as permitted by the prong structure. The bending of the coil 16 effectively absorbs the stresses that would otherwise be transmitted to the strut 28.

The placement of the lower prongs 108 and 110 at a ninety degree displacement from the upper pair of prongs isolates the lower pair from the effect of thermal incompatibility between the upper portion of the spacer 14 and the torquer coil 16.

Thus, it is seen that the present invention provides an improved integrated accelerometer that incorporates many features which enhance reliability, effective lifetime and accuracy. By utilizing the teachings of this invention, one may enjoy the inherent manufacturing advantages of a planar integrated accelerometer while achieving enhanced performance.

While this invention has been disclosed with reference to a presently preferred embodiment, it is not limited thereto. Rather, the scope of this invention is limited only insofar as defined by the following set of claims and includes all equivalents thereof.

What is claimed is:

1. An integrated accelerometer comprising in combination:
   a) a planar support base having an internal aperture;
   b) a pendulous mass, said mass including a pair of arms;
   c) a pair of spaced flexible hinges for pivotally supporting said pendulous mass within said aperture;
   d) a substantially round torquer coil;
   e) a substantially round interface spacer of material having a coefficient of thermal expansion that is less than that of the coil, said spacer being fixed to said pendulous mass and to said coil for substantially limiting the transmission of mechanical stresses between said coil and said pendulous mass; and
   f) said spacer including (i) a pair of upstanding prongs at the upper edge of said spacer for contacting said torquer coil and (ii) a pair of downwardly-directed prongs at the lower edge of said spacer for contacting said pendulous mass.

2. An integrated accelerometer as defined in claim 1 wherein said interface spacer is further characterized in that;
   a) said upstanding prongs are located at substantially diametrically-opposed portions of said upper edge of said spacer; and
   b) said downwardly-directed prongs are located at substantially diametrically-opposed portions of said lower edge of said spacer.

3. An integrated accelerometer as defined in claim 2 wherein said pair of upstanding prongs is located at said upper edge of said spacer substantially orthogonal with respect to the location of said downwardly-directed prongs at the lower edge of said spacer.

* * * * *